US009606557B2

(12) United States Patent
Kim

(10) Patent No.: US 9,606,557 B2
(45) Date of Patent: Mar. 28, 2017

(54) INTEGRATED CIRCUIT

(71) Applicant: SK hynix Inc., Gyeonggi-do (KR)

(72) Inventor: Kwan-Dong Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 85 days.

(21) Appl. No.: 14/637,024

(22) Filed: Mar. 3, 2015

(65) Prior Publication Data

US 2016/0116926 A1 Apr. 28, 2016

(30) Foreign Application Priority Data

Oct. 22, 2014 (KR) ........................ 10-2014-0143266

(51) Int. Cl.

*H02M 1/08* (2006.01)
*G05F 1/10* (2006.01)
*G05F 1/56* (2006.01)
*G06F 1/32* (2006.01)

(52) U.S. Cl.

CPC ...................................... *G05F 1/56* (2013.01)

(58) Field of Classification Search

CPC ........ G06F 1/32; G06F 1/3296; H02M 3/156; H02M 3/157; H02M 2001/0006; H02M 2001/0025; H02M 2001/0032; H02M 1/08; G05F 1/10

See application file for complete search history.

(56) References Cited

U.S. PATENT DOCUMENTS 7,737,719 B2 * 6/2010 Park ................. H03K 19/01850 326/30
8,358,117 B1 1/2013 Chui et al.
2002/0194516 A1 * 12/2002 Muratov ................... G06F 1/26 713/320
2013/0086396 A1 * 4/2013 Liu ......................... G06F 1/266 713/300
2013/0278233 A1 * 10/2013 Lee ......................... G05F 1/575 323/280

* cited by examiner

*Primary Examiner* — Gary L Laxton
(74) *Attorney, Agent, or Firm* — IP & T Group LLP

(57) ABSTRACT

An integrated circuit may include a receiver suitable for comparing voltage levels of an external signal and a reference voltage with each other, and generating an internal signal, an adjustment code generation unit suitable for detecting a duty of the internal signal and generating an adjustment code of one or more bits, and a voltage adjustment unit suitable for adjusting the voltage level of the reference voltage in response to the adjustment code.

15 Claims, 5 Drawing Sheets

INTEGRATED CIRCUIT

CROSS-REFERENCE TO RELATED APPLICATIONS

The present application claims priority of Korean Patent Application No. 10-2014-0143266, filed on Oct. 22, 2014, which is incorporated herein by reference in its entirety.

BACKGROUND

1. Field

Exemplary embodiments of the present invention relate to an integrated circuit, and more particularly, to a technology for improving the quality of signals received in an integrated circuit.

2. Description of the Related Art

FIG. 1 is a diagram illustrating a receiver 100, and FIG. 2A and FIG. 2B are diagrams illustrating signals IN, VREF, and OUT inputted/outputted to/from the receiver 100. The input signal IN may have various patterns, but for convenience, FIG. 2A and FIG. 2B illustrate that the input signal IN is inputted with substantially the same pattern (a repetition pattern of 'H', 'L', 'H', and 'L') as that of a clock.

Referring to FIG. 1, the receiver 100 compares a voltage level of the input signal IN with a voltage level of the reference voltage VREF and generates the output signal OUT. When the voltage level of the input signal IN is higher than the voltage level of the reference voltage VREF, the receiver 100 generates the output signal OUT at a 'H' level, and when the voltage level of the input signal IN is lower than the voltage level of the reference voltage VREF, the receiver 100 generates the output signal OUT at a 'L' level.

FIG. 2A is a diagram illustrating the waveforms of the signals IN, VREF, and OUT inputted/outputted to/from the receiver 100 when the level of the reference voltage VREF is relatively low. Referring to FIG. 2A, as the level of the reference voltage VREF becomes low, the high pulse width of the output signal OUT becomes long and the low pulse width of the output signal OUT becomes short. In such a case, since the eye pattern of the output signal OUT widens when the output signal OUT is 'H' but it becomes narrow when the output signal OUT is 'L', the output signal OUT may be incorrectly recognized at the rear end of the receiver 100.

FIG. 2B is a diagram illustrating the waveforms of the signals IN, VREF, and OUT inputted/outputted to/from the receiver 100 when the level of the reference voltage VREF is relatively high. Referring to FIG. 2B, as the level of the reference voltage VREF becomes high, the low pulse width of the output signal OUT becomes long and the high pulse width of the output signal OUT becomes short. In such a case, since the eye pattern of the output signal OUT widens when the output signal OUT is 'L' but it becomes narrow when the output signal OUT is 'H', the output signal OUT may also be incorrectly recognized at the rear end of the receiver 100.

As described above, in the receiver 100 that receives the input signal IN by using a scheme of comparing the reference voltage VREF and the input signal IN with each other, the reference voltage VREF is an important factor in deciding the quality of the output signal OUT of the receiver 100.

SUMMARY

Various embodiments of the present invention are directed to a technology for adjusting the level of a reference voltage used in a receiver to an optimal level.

In an embodiment, an integrated circuit may include a receiver suitable for comparing voltage levels of an external signal and a reference voltage with each other, and generating an internal signal, an adjustment code generation unit suitable for detecting a duty of the internal signal and generating an adjustment code of one or more bits, and a voltage adjustment unit suitable for adjusting the voltage level of the reference voltage in response to the adjustment code.

The adjustment code generation unit may be activated for a tuning period and the external signal may have a clock pattern during the tuning period. When the tuning period is ended, the adjustment code generation unit may be deactivated and a value of the adjustment code may be fixed.

In another embodiment, an integrated circuit may include a reference voltage generation unit suitable for generating a reference voltage, an isolation unit suitable for reflecting a voltage level of the reference voltage in a voltage level of a first reference voltage and a voltage level of a second reference voltage, a first receiver suitable for comparing voltage levels of a first external signal and the first reference voltage with each other, and generating a first internal signal, a second receiver suitable for comparing voltage levels of a second external signal and the second reference voltage with each other, and generating a second internal signal, a first adjustment code generation unit suitable for detecting a duty of the first internal signal and generating a first adjustment code of one or more bits, a second adjustment code generation unit suitable for detecting a duty of the second internal signal and generating a second adjustment code of one or more bits, a first voltage adjustment unit suitable for adjusting the voltage level of the first reference voltage in response to the first adjustment code, and a second voltage adjustment unit suitable for adjusting the voltage level of the second reference voltage in response to the second adjustment code.

The isolation unit may substantially prevent variation in the voltage level of the first reference voltage from having influence on the reference voltage and the second reference voltage, and may substantially prevent variation in the voltage level of the second reference voltage from having influence on the reference voltage and the first reference voltage.

The first adjustment code generation unit and the second adjustment code generation unit may be activated during a tuning period and the first external signal and the second external signal may have a clock pattern during the tuning period. When the tuning period is ended, the first adjustment code generation unit and the second adjustment code generation unit may be deactivated and values of the first adjustment code and the second adjustment code may be fixed.

In another embodiment, an integrated circuit may include a first receiver suitable for receiving an internal signal, an adjustment code generation unit suitable for detecting a duty of an output signal of the first receiver and generating an adjustment code of one or more bits, and a voltage adjustment unit suitable for adjusting a voltage level of the internal signal in response to the adjustment code.

The integrated circuit may further include a second receiver suitable for comparing voltage levels of an external signal and a reference voltage with each other, and generating an internal signal.

The adjustment code generation unit may be activated for a tuning period and the internal signal may have a clock pattern for the tuning period. When the tuning period is ended, the adjustment code generation unit may be deactivated and a value of the adjustment code may be fixed.

According to the embodiments of the present invention, the level of the reference voltage used in the receiver is optimized, so that it is possible to improve the quality of signals received through the receiver.

DETAILED DESCRIPTION

Figure 1:
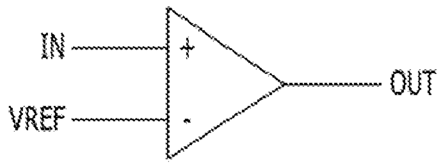
FIG. 1 (PRIOR ART)
FIG. 1 is a diagram illustrating a receiver 100.
Figure 2A:
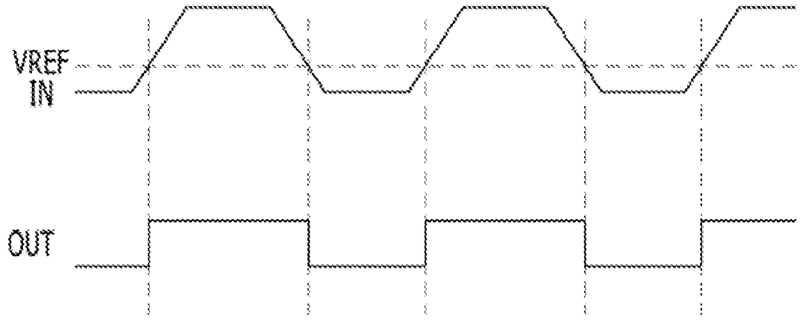
FIG. 2A (PRIOR ART)
FIG. 2A and FIG. 2B are diagrams illustrating signals IN, VREF, and OUT inputted/outputted to/from the receiver 100 of FIG. 1.
Figure 2B:
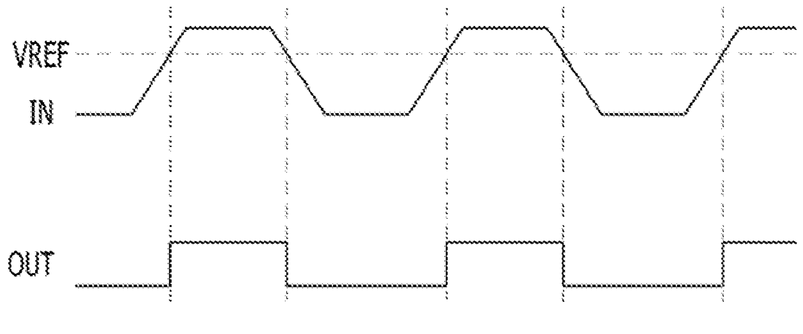
FIG. 2B (PRIOR ART)

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. It is also noted that in this specification, "connected/coupled" refers to one component not only directly coupling another component but also indirectly coupling another component through an intermediate component. In addition, a singular form may include a plural form as long as it is not specifically mentioned in a sentence.

Figure 3:
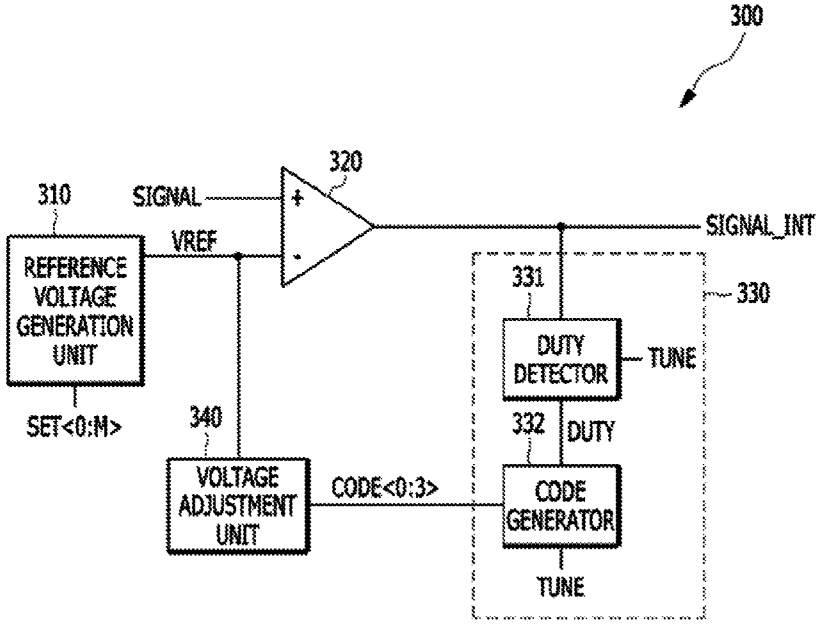
FIG. 3 is a configuration diagram of an integrated circuit 300 in accordance with an embodiment of the present invention.

FIG. 3 is a configuration diagram of an integrated circuit 300 in accordance with an embodiment of the present invention.

Referring to FIG. 3, the integrated circuit 300 may include a reference voltage generation unit 310, a receiver 320, an adjustment code generation unit 330, and a voltage adjustment unit 340. The integrated circuit 300 may include all types of semiconductor devices that receive signals from an exterior (i.e. an external source) such as a memory device, a CPU (Central Processing Unit), a GPU (Graphic Processing Unit), a DSP (Digital Signal Processor), an AP (Application Processor), or various controllers.

The reference voltage generation unit 310 may generate a reference voltage VREF. The reference voltage generation unit 310 may set a voltage level of the reference voltage VREF in response to setting values SET<0:M>. The setting values SET<0:M> may be inputted from outside of the integrated circuit 300, or may also be stored in the integrated circuit 300. FIG. 3 illustrates that the reference voltage VREF used in the receiver 320 is generated in the reference voltage generation unit 310 of the integrated circuit 300. However, the reference voltage VREF may not be generated in the integrated circuit 300, and the reference voltage VREF generated outside the integrated circuit 300 may also be inputted to the integrated circuit 300 for use.

The receiver 320 may compare a level of an external signal SIGNAL inputted from the outside of the integrated circuit 300 with the level of the reference voltage VREF, and generate an internal signal SIGNAL_INT. The receiver 320 may generate the internal signal SIGNAL_INT at a 'H' level when the voltage level of the external signal SIGNAL is higher than that of the reference voltage VREF, and generate the internal signal SIGNAL_INT at a 'L' level when the voltage level of the external signal SIGNAL is lower than that of the reference voltage VREF.

The adjustment code generation unit 330 may detect a duty (or a duty cycle) of the internal signal SIGNAL_INT, that is, a ratio of a low pulse width to a high pulse width of the internal signal SIGNAL_INT, and generate adjustment codes CODE<0:3>. The adjustment code generation unit 330 may change values of the adjustment codes CODE<0:3> to increase the level of the reference voltage VREF when the high pulse width of the internal signal SIGNAL_INT is longer than the low pulse width thereof, and change the values of the adjustment codes CODE<0:3> to decrease the level of the reference voltage VREF when the low pulse width of the internal signal SIGNAL_INT is longer than the high pulse width thereof.

The adjustment code generation unit 330 may include a duty detector 331 and a code generator 332. The duty detector 331 may detect the duty of the internal signal SIGNAL_INT. The duty detector 331 may generate a detection result DUTY to 'H' when the high pulse width of the internal signal SIGNAL_INT is longer than the low pulse width thereof, and generate the detection result DUTY to 'L' when the low pulse width of the internal signal SIGNAL_INT is longer than the high pulse width thereof. When the detection result DUTY is 'H', the code generator 332 may change the values of the adjustment codes CODE<0:3> to increase the reference voltage VREF, and when the detection result DUTY is 'L', the code generator 332 may change the values of the adjustment codes CODE<0:3> to decrease the reference voltage VREF. In the present embodiment, the adjustment codes CODE<0:3> are 4 bits. However, the adjustment codes may not be 4 bits and it is obvious that the adjustment codes may have an arbitrary bit number equal to or more than 1. The following Table 1 shows the values of the adjustment codes CODE<0:3>, wherein the reference voltage VREF may increase from the bottom to the top of Table 1 and decrease from the top to the bottom thereof. For example, when the detection result DUTY is 'H' in the state in which the adjustment codes CODE<0:3> have initial values 'H', 'H', 'L', and 'L', the values of the adjustment codes CODE<0:3> may be changed to 'L', 'H', 'L', and 'L' corresponding to one step UP. When the detection result DUTY is 'L' in the state in which the values of the adjustment codes CODE<0:3> are 'H', 'H', 'H', and 'L' corresponding to one step DOWN, the values of the adjustment codes CODE<0:3> may be changed to 'H', 'H', 'H', and 'H' corresponding to two steps DOWN.

TABLE 1

| | CODE<0> | CODE<1> | CODE<2> | CODE<3> |
|---|---|---|---|---|
| Two step UP | L | L | L | L |
| One step UP | L | H | L | L |
| Initial value | H | H | L | L |
| One step DOWN | H | H | H | L |
| Two step DOWN | H | H | H | H |

The adjustment code generation unit 330 may be activated for a tuning period in which a tuning signal TUNE has been activated, and may be deactivated in periods other than the tuning period, that is, for a period in which the tuning signal TUNE has been deactivated. The duty detector 331 may detect the duty of the internal signal SIGNAL_INT only for the period in which the tuning signal TUNE has been activated, and may not detect the duty of the internal signal SIGNAL_INT when the tuning signal TUNE has been deactivated. The code generator 332 may change the values of the adjustment codes CODE<0:3> in response to the detection result DUTY only when the tuning signal TUNE has been activated, and may fix the values of the adjustment codes CODE<0:3> when the tuning signal TUNE has been deactivated. For the tuning period in which the tuning signal TUNE has been activated, the external signal SIGNAL may be inputted with a clock pattern, that is, a repetition pattern of 'H' and 'L', and may have various patterns in periods other than the tuning period.

The voltage adjustment unit 340 may adjust the level of the reference voltage VREF in response to the adjustment codes CODE<0:3>. As the adjustment codes CODE<0:3> have values at the upper step in Table 1 above, the voltage adjustment unit 340 may adjust the reference voltage VREF to have a higher value, and as the adjustment codes CODE<0:3> have values at the lower step in Table 1 above, the voltage adjustment unit 340 may adjust the reference voltage VREF to have a lower value.

Figure 4:
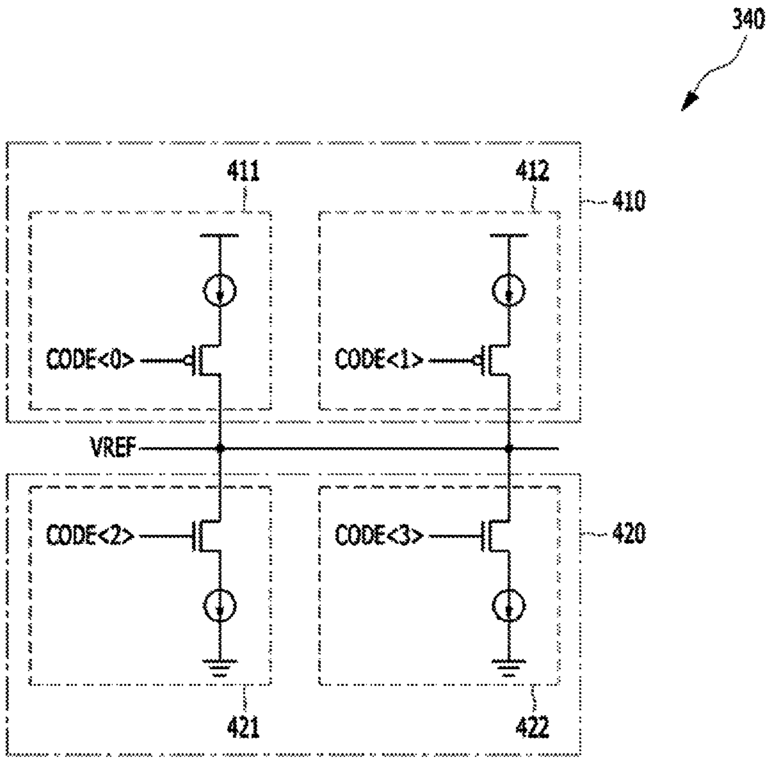
FIG. 4 is a configuration diagram of an embodiment of a voltage adjustment unit 340 of FIG. 3.

FIG. 4 is a configuration diagram of an embodiment of the voltage adjustment unit 340 of FIG. 3.

Referring to FIG. 4, the voltage adjustment unit 340 may include a pull-up section 410 and a pull-down section 420.

The pull-up section 410 may increase the level of the reference voltage VREF in response to the adjustment codes CODE<0:1>. The pull-up section 410 includes two legs 411 and 412, wherein the first leg 411 may be turned on and increase the level of the reference voltage VREF when the value of the adjustment codes CODE<0> is 'L', and the second leg 412 may be turned on and may increase the level of the reference voltage VREF when the value of the adjustment codes CODE<1> is 'L'.

The pull-down section 420 may decrease the level of the reference voltage VREF in response to the adjustment codes CODE<2:3>. The pull-down section 420 includes two legs 421 and 422, wherein the third leg 421 may be turned on and decrease the level of the reference voltage VREF when the value of the adjustment codes CODE<2> is 'H', and the fourth leg 422 may be turned on and decrease the level of the reference voltage VREF when the value of the adjustment codes CODE<3> is 'H'.

FIG. 4 illustrates that the voltage adjustment unit 340 includes the pull-up section 410 and the pull-down section 420. However, it is obvious that the voltage adjustment unit 340 may be designed to include only the pull-up section 410 or only the pull-down section 420. Furthermore, it is obvious that the voltage adjustment unit 340 that adjusts the level of the reference voltage VREF in response to the adjustment codes CODE<0:3> may be designed in various schemes.

Figure 5:
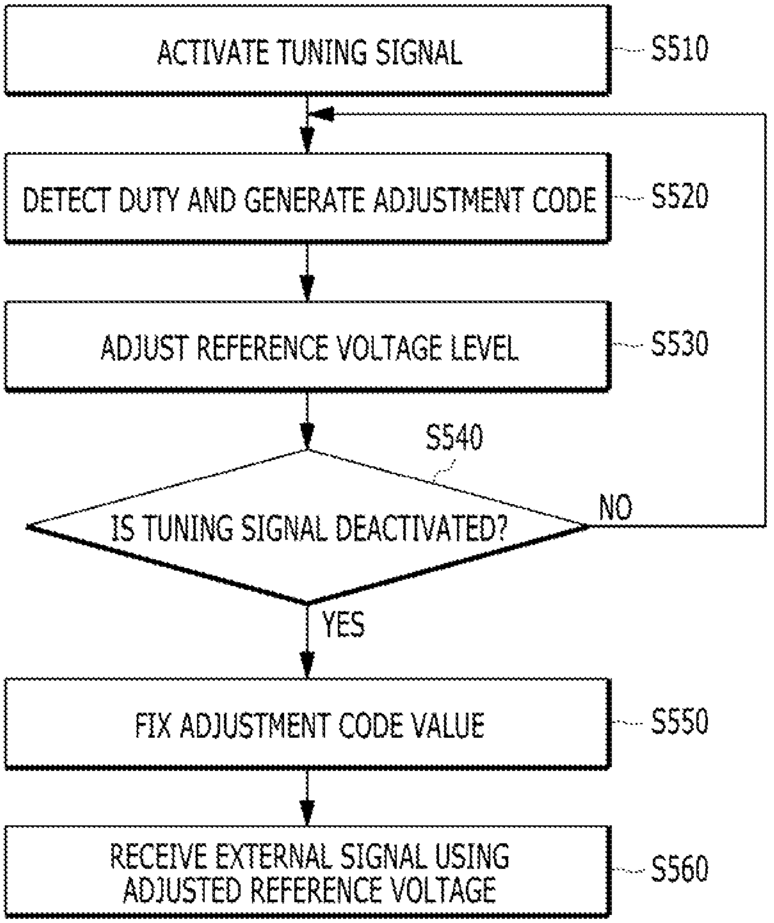
FIG. 5 is a diagram illustrating the operation of the integrated circuit 300 of FIG. 3.

FIG. 5 is a diagram illustrating the operation of the integrated circuit 300 of FIG. 3.

Referring to FIG. 5, the tuning signal TUNE may be activated and the tuning period of the integrated circuit 300 may start (S510). The tuning period is a period for tuning the level of the reference voltage VREF, wherein for the tuning period, the external signal SIGNAL inputted to the integrated circuit 300 may have a clock pattern.

In the tuning period, the duty of the internal signal SIGNAL_INT may be detected by the adjustment code generation unit 330 and the adjustment codes CODE<0:3> may be generated by the adjustment code generation unit 330 (S520). The adjustment code generation unit 330 may generate the adjustment codes CODE<0:3> to increase the reference voltage VREF when the high pulse width of the internal signal SIGNAL_INT is longer than the low pulse width thereof, and generate the adjustment codes CODE<0:3> to decrease the reference voltage VREF when the low pulse width of the internal signal SIGNAL_INT is longer than the high pulse width thereof.

The voltage adjustment unit 340 may adjust the level of the reference voltage VREF in response to the adjustment codes CODE<0:3>. By the operation of the voltage adjustment unit 340, the level of the reference voltage VREF may be adjusted to an optimal value for allowing the high pulse width of the internal signal SIGNAL_INT to substantially equal the low pulse width of the internal signal SIGNAL_INT.

Until the tuning period is ended, steps S520 and S530 may be continuously repeated (N in S540). When the tuning signal TUNE is deactivated and the tuning period is ended (Y in S540), the values of the adjustment codes CODE<0:3> are fixed (S550). That is, the adjustment codes CODE<0:3> may be fixed to an optimal value.

By using the reference voltage VREF adjusted to the optimal value, the receiver 320 may receive the external signal SIGNAL (S560). Since the tuning period has been ended, the external signal SIGNAL does not need to have the clock pattern and may be inputted with various patterns. Since the receiver 320 receives the external signal SIGNAL by using the reference voltage VREF adjusted to the optimal value, it is possible to generate the internal signal SIGNAL_INT with high quality.

Figure 6:
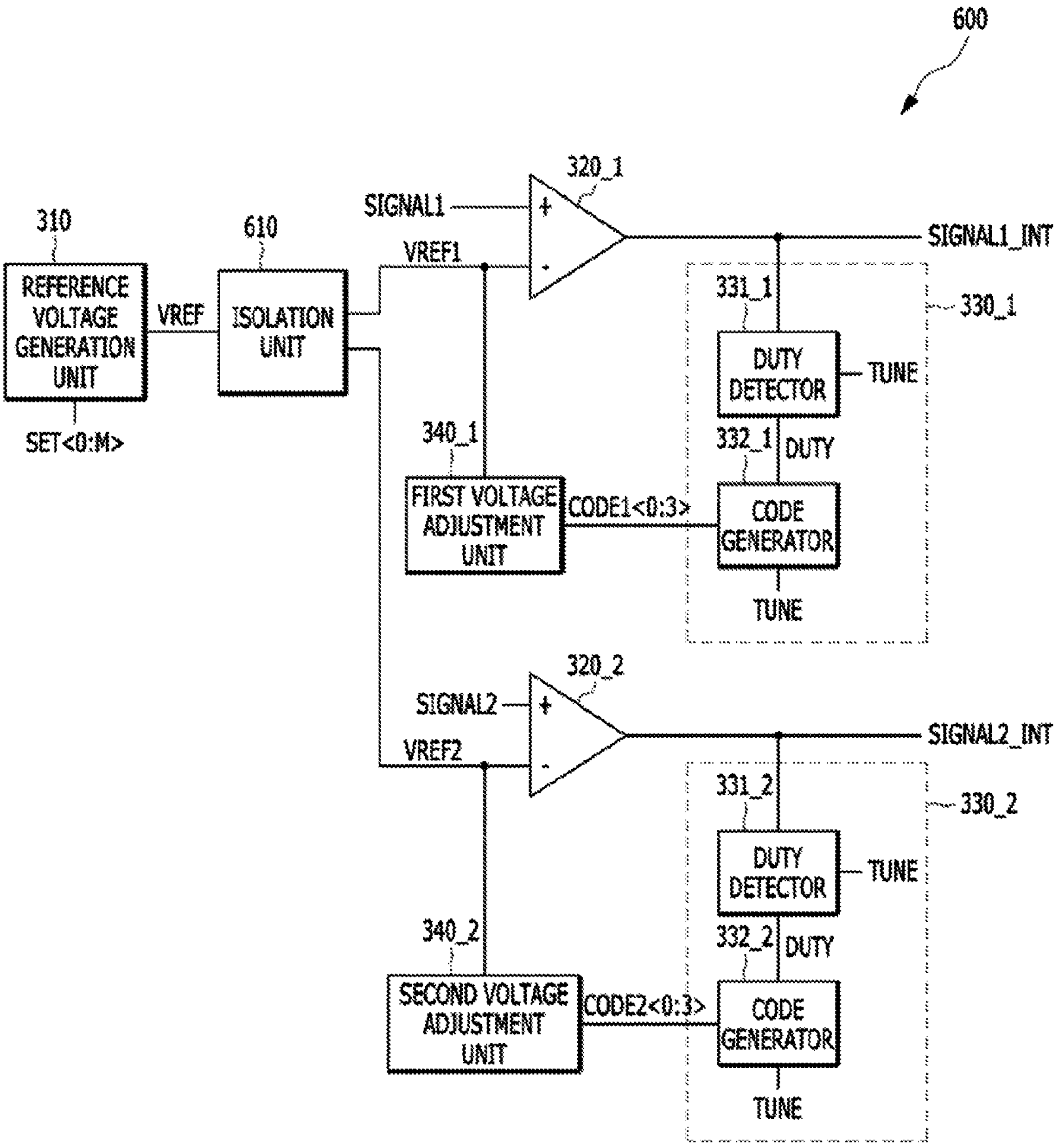
FIG. 6 is a configuration diagram of an integrated circuit 600 in accordance with another embodiment of the present invention.

FIG. 6 is a configuration diagram of an integrated circuit 600 in accordance with another embodiment of the present invention. In FIG. 6, it is described as an embodiment that the integrated circuit 600 includes a plurality of receivers.

Referring to FIG. 6, the integrated circuit 600 may include the reference voltage generation unit 310, an isolation unit 610, receivers 320_1 and 320_2, adjustment code generation units 330_1 and 330_2, and voltage adjustment units 340_1 and 340_2. The integrated circuit 600 may include all types of semiconductor devices that receive signals from an exterior such as a memory device, a CPU (Central Processing Unit), a GPU (Graphic Processing Unit), a DSP (Digital Signal Processor), an AP (Application Processor), or various controllers.

The reference voltage generation unit 310 may generate the reference voltage VREF. The reference voltage generation unit 310 may set the voltage level of the reference voltage VREF in response to the setting values SET<0:M>. The setting values SET<0:M> may be inputted from outside of the integrated circuit 600, or may also be stored in the integrated circuit 600. FIG. 6 illustrates that the reference voltage VREF is generated in the reference voltage generation unit 310 of the integrated circuit 600. However, the reference voltage VREF may not be generated in the integrated circuit 600, and the reference voltage VREF generated outside the integrated circuit 600 may also be inputted to the integrated circuit 600 for use.

The isolation unit 610 reflects the level of the reference voltage VREF generated in the reference voltage generation unit 310 in a level of a first reference voltage VREF1 and a level of a second reference voltage VREF2. However, it is possible to prevent variation in the level of the first reference voltage VREF1 from having influence on the reference voltage VREF and the second reference voltage VREF2, and to prevent variation in the level of the second reference voltage VREF2 from having influence on the reference voltage VREF and the first reference voltage VREF1. That is, the isolation unit 610 allows variation in the level of the reference voltage VREF to have influence on the first reference voltage VREF1 and the second reference voltage VREF2, substantially prevents voltage variation in the first reference voltage VREF1 from having influence on the other reference voltages VREF and VREF2, and substantially prevents voltage variation in the second reference voltage VREF2 from having influence on the other reference voltage VREF and VREF1. For example, when the reference voltage VREF of 0.7 V is generated in the reference voltage generation unit 310, the first reference voltage VREF1 and the second reference voltage VREF2 may become 0.7 V based on the reference voltage VREF and may be finely adjusted to 0.72 and 0.67 V by the first voltage adjustment unit 340_1 and the second voltage adjustment unit 340_2, respectively. At this time, the finely adjusted first reference voltage VREF1 of 0.72 V may not be reflected in the reference voltages VREF and VREF2, and the finely adjusting second reference voltage VREF2 of 0.67 V may not be reflected in the reference voltages VREF and VREF1. That is, the isolation unit 610 may reflect the level of the reference voltage VREF in the first reference voltage VREF1 and the second reference voltage VREF2, and may allow the first reference voltage VREF1 and the second reference voltage VREF2 to be independently and finely adjusted.

The first receiver 320_1 may compare the first reference voltage VREF1 with a first external signal SIGNAL1 and generate a first internal signal SIGNAL1_INT, and the second receiver 320_2 may compare the second reference voltage VREF2 with a second external signal SIGNAL2 and generate a second internal signal SIGNAL2_INT.

The first adjustment code generation unit 330_1 may detect a duty of the first internal signal SIGNAL1_INT and generate first adjustment codes CODE1<0:3>, and the second adjustment code generation unit 330_2 may detect a duty of the second internal signal SIGNAL2_INT and generate second adjustment codes CODE2<0:3>.

The first voltage adjustment unit 340_1 may adjust the level of the first reference voltage VREF1 to an optimal value in response to the first adjustment codes CODE1<0:3>, and the second voltage adjustment unit 340_2 may adjust the level of the second reference voltage VREF2 to an optimal value in response to the second adjustment codes CODE2<0:3>.

Since the Integrated circuit 600 of FIG. 6 may operate in substantially the same scheme as that of the integrated circuit 300 of FIG. 3, except that the reference voltages VREF1 and VREF2 are independently adjusted for the receivers 320_1 and 320_2, a detailed description thereof will be omitted in order to avoid redundancy.

FIG. 6 illustrates that the number of the receivers 320_1 and 320_2 is two, and the number of the adjustment code generation units 330_1 and 330_2 is two, and the number of the voltage adjustment units 340_1 and 340_2 is two. However, it is obvious that the number of elements may increase. Particularly, in a device (for example, a memory device) that uses several tens of receivers (for example, 32 receivers) in order to receive data, the effect of the present invention can be maximized when one reference voltage generation unit 310 is provided, and reference voltages (for example, VREF1 to VREF32) used in several tens of receivers (for example, 320_1 to 320_32) are substantially prevented from having influence on one another through the isolation unit 610, and the reference voltages (for example, VREF1 to VREF32) are adjusted to the receivers 320_1 to 320_32 through several tens of voltage adjustment units (for example, 340_1 to 340_32).

Figure 7:
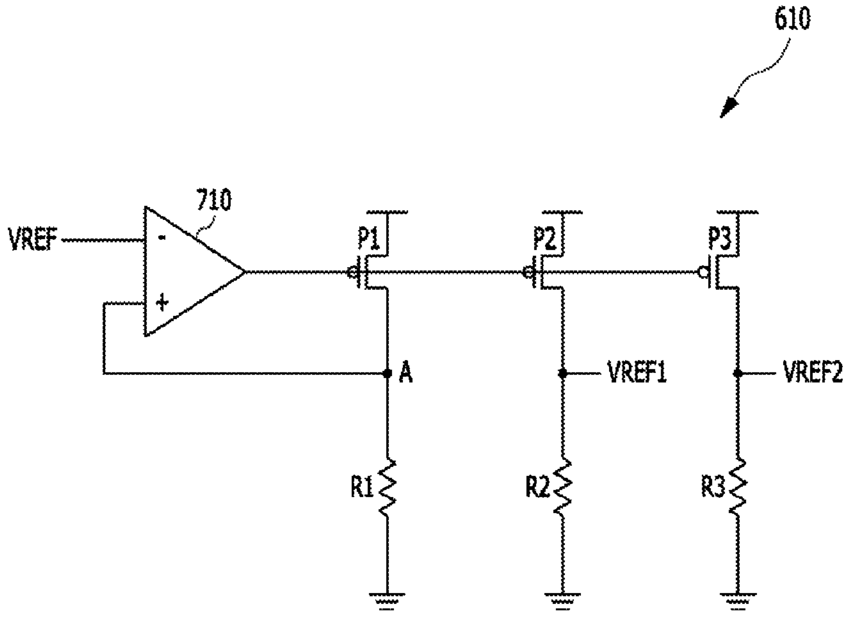
FIG. 7 is a configuration diagram of an embodiment of an isolation unit 610 of FIG. 6.

FIG. 7 is a configuration diagram of an embodiment of the isolation unit 610 of FIG. 6.

Referring to FIG. 7, the isolation unit 610 may include an operational amplifier 710, PMOS transistors P1, P2, and P3, and resistors R1, R2, and R3.

According to the operation of the isolation unit 610, the operational amplifier 710 drives the PMOS transistor P1 such that a terminal A has substantially the same voltage level as that of the reference voltage VREF. Since a first reference voltage terminal VREF1 and a second reference voltage terminal VREF2 have substantially the same electrical state as that of the terminal A, that is, since the PMOS transistors P2 and P3 receive substantially the same gate voltage as the PMOS transistor P1, the first reference voltage terminal VREF1 and the second reference voltage terminal VREF2 may also be driven at substantially the same voltage level as that of the reference voltage VREF.

A variation in the voltage level of the first reference voltage terminal VREF1 may not have any influence on the terminal A and the second reference voltage terminal VREF2, and a variation in the voltage level of the second reference voltage terminal VREF2 may not have any influence on the terminal A and the first reference voltage terminal VREF1.

Figure 8:
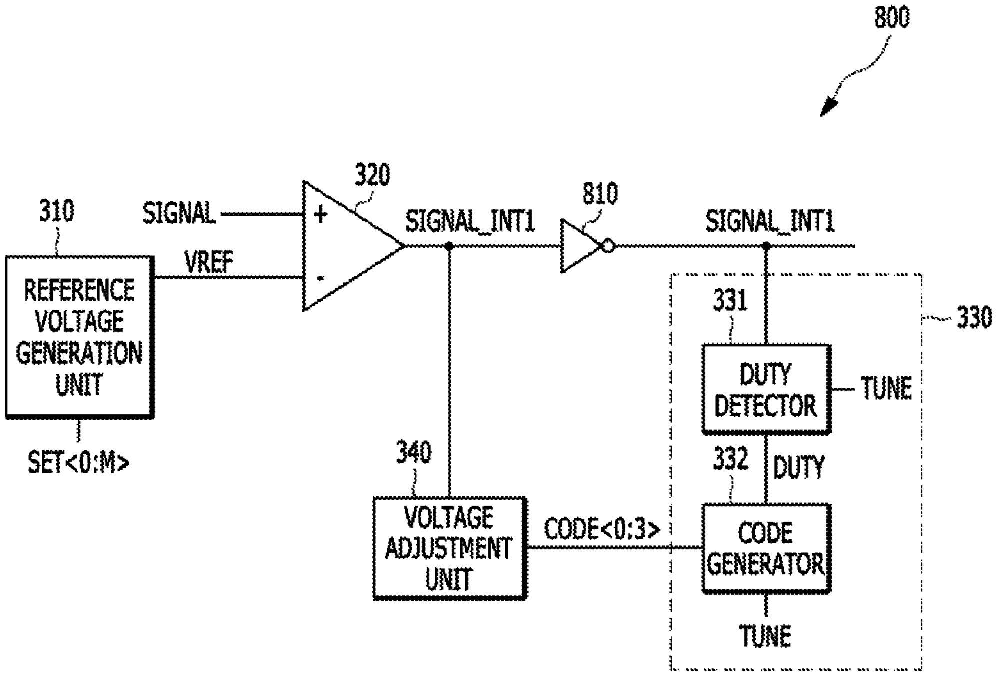
FIG. 8 is a configuration diagram of an integrated circuit 800 in accordance with further embodiment of the present invention.

FIG. 8 is a configuration diagram of an integrated circuit 800 in accordance with a further embodiment of the present invention. In FIG. 8, it is described as an embodiment that the integrated circuit 800 adjusts a voltage level of an internal signal SIGNAL_INT1 having passed through the receiver 320, instead of the reference voltage VREF.

Referring to FIG. 8, the integrated circuit 800 may include the reference voltage generation unit 310, a first receiver 810, the second receiver 320, the adjustment code generation unit 330, and the voltage adjustment unit 340.

The second receiver 320 may compare the levels of the external signal SIGNAL and the reference voltage VREF with each other and generate a first internal signal SIGNAL_INT1. The first receiver 810 may buffer the first internal signal SIGNAL_INT1 of the second receiver 320 and generate a second internal signal SIGNAL_INT2. The first receiver 810 may be an inverter and the second internal signal SIGNAL_INT2 may have a phase opposite to that of the first internal signal SIGNAL_INT1.

The adjustment code generation unit 330 may detect a duty of the second internal signal SIGNAL_INT2 and generate adjustment codes CODE<0:3>. When a high pulse width of the second internal signal SIGNAL_INT2 is longer than a low pulse width thereof, that is, when a low pulse width of the first internal signal SIGNAL_INT1 is longer than a high pulse width thereof, the adjustment code generation unit 330 may change the adjustment codes CODE<0:3> to increase the voltage level of the first internal signal SIGNAL_INT1. When the low pulse width of the second internal signal SIGNAL_INT2 is longer than the high pulse width thereof, that is, when the high pulse width of the first internal signal SIGNAL_INT1 is longer than the low pulse width thereof, the adjustment code generation unit 330 may change the adjustment codes CODE<0:3> to decrease the voltage level of the first internal signal SIGNAL_INT1.

The voltage adjustment unit 340 may adjust the voltage level of the first internal signal SIGNAL_INT1 based on the adjustment codes CODE<0:3>.

Since the integrated circuit 800 of FIG. 8 operates in substantially the same scheme as that of the integrated circuit 300 of FIG. 3, except for the duty of the second internal signal SIGNAL_INT2, other than the first internal signal SIGNAL_INT1, is detected and the voltage level of the first internal signal SIGNAL_INT1, other than the reference voltage VREF, is adjusted, a detailed description thereof will be omitted in order to avoid redundancy.

Although various embodiments have been described for illustrative purposes, it will be apparent to those skilled in the art that various changes and modifications may be made without departing from the spirit and scope of the invention as defined in the following claims.

What is claimed is:

1. An integrated circuit comprising:
- a receiver suitable for comparing voltage levels of an external signal and a reference voltage with each other, and generating an internal signal having a value corresponding to the external signal;
- an adjustment code generation unit suitable for detecting a duty of the internal signal and generating an adjustment code of one or more bits; and
- a voltage adjustment unit suitable for adjusting the reference voltage in response to the adjustment code,
- wherein the adjustment code generation unit is activated for a tuning period and the external signal has a clock pattern during the tuning period.

2. The integrated circuit of claim 1, wherein when the tuning period is ended, the adjustment code generation unit is deactivated and a value of the adjustment code is fixed.

3. The integrated circuit of claim 1, wherein the voltage adjustment unit comprises:
- a pull-down section suitable for decreasing the reference voltage in response to the adjustment code.

4. The integrated circuit of claim 1, wherein the voltage adjustment unit comprises:
- a pull-up section suitable for increasing the reference voltage in response to the adjustment code.

5. The integrated circuit of claim 1, wherein the voltage adjustment unit comprises:
- a pull-up section suitable for increasing the reference voltage in response to the adjustment code; and
- a pull-down section suitable for decreasing the reference voltage in response to the adjustment code.

6. The integrated circuit of claim 1, wherein the adjustment code generation unit comprises:
- a duty detector suitable for detecting the duty of the internal signal; and
- a code generator suitable for generating the adjustment code in response to a detection result of the duty detector.

7. The integrated circuit of claim 1, further comprising:
- a reference voltage generation unit suitable for generating the reference voltage.

8. The integrated circuit of claim 6, wherein the duty detector detects a ratio of a low pulse width to a high pulse width of the internal signal.

9. The integrated circuit of claim 8, wherein the voltage adjustment unit increases the reference voltage when the high pulse width of the internal signal is longer than the low pulse width thereof, and decreases the reference voltage when the low pulse width of the internal signal is longer than the high pulse width thereof.

10. An integrated circuit comprising:
- a reference voltage generation unit suitable for generating a main reference voltage;
- an isolation unit suitable for receiving the main reference voltage to generate a first reference voltage and a second reference voltage;
- a first receiver suitable for comparing voltage levels of a first external signal and the first reference voltage with each other, and generating a first internal signal;
- a second receiver suitable for comparing voltage levels of a second external signal and the second reference voltage with each other, and generating a second internal signal;
- a first adjustment code generation unit suitable for detecting a duty of the first internal signal and generating a first adjustment code of one or more bits;
- a second adjustment code generation unit suitable for detecting a duty of the second internal signal and generating a second adjustment code of one or more bits;
- a first voltage adjustment unit suitable for adjusting the first reference voltage in response to the first adjustment code; and
- a second voltage adjustment unit suitable for adjusting the second reference voltage in response to the second adjustment code.

11. The integrated circuit of claim 10, wherein the isolation unit substantially prevents variation in the first reference voltage from influencing the main reference voltage and the second reference voltage, and substantially prevents variation in the second reference voltage from influencing the main reference voltage and the first reference voltage.

12. The integrated circuit of claim 10, wherein the first adjustment code generation unit and the second adjustment code generation unit are activated during a tuning period and the first external signal and the second external signal have a clock pattern during the tuning period.

13. The integrated circuit of claim 12, wherein when the tuning period is ended, the first adjustment code generation unit and the second adjustment code generation unit are deactivated and values of the first adjustment code and the second adjustment code are fixed.

14. The integrated circuit of claim 10, wherein the main reference voltage has a voltage level determined based on a reference voltage setting code.

15. An integrated circuit comprising:
- a first receiver suitable for receiving an internal signal;
- a second receiver suitable for comparing voltage levels of an external signal and a reference voltage with each other, and generating the internal signal;
- an adjustment code generation unit suitable for detecting a duty of an output signal of the first receiver and generating an adjustment code of one or more bits; and
- a voltage adjustment unit suitable for adjusting a voltage level of the internal signal in response to the adjustment code,
- wherein the adjustment code generation unit is activated for a tuning period and the internal signal has a clock pattern for the tuning period, and
- wherein when the tuning period is ended, the adjustment code generation unit is deactivated and a value of the adjustment code is fixed.

* * * * *